United States Patent [19]

Hudak

[11] 4,006,387
[45] Feb. 1, 1977

[54] LOW POWER SOLID STATE THREE-PHASE OVERCURRENT/UNDERCURRENT PROTECTION CIRCUIT

[75] Inventor: Joseph M. Hudak, Rome, N.Y.

[73] Assignee: The United States of America as represented by the Secretary of the Air Force, Washington, D.C.

[22] Filed: Sept. 22, 1975

[21] Appl. No.: 615,759

[52] U.S. Cl. .................. 317/27 R; 317/36 TD; 317/49
[51] Int. Cl.² .................................. H02H 3/26
[58] Field of Search .......... 317/36 TD, 33 R, 27 R, 317/46, 49, 31; 340/253 A

[56] References Cited
UNITED STATES PATENTS

| | | | |
|---|---|---|---|
| 3,223,891 | 12/1965 | McClymont | 317/27 R |
| 3,602,776 | 8/1971 | Gonnam | 317/36 TD X |
| 3,699,431 | 10/1972 | Paddison et al. | 317/36 TD X |
| 3,742,303 | 6/1973 | Dageford | 317/36 TD X |
| 3,783,341 | 1/1974 | Beckwith | 317/27 R |

Primary Examiner—Harold Broome
Assistant Examiner—Patrick R. Salce
Attorney, Agent, or Firm—Joseph E. Rusz; Willard R. Matthews, Jr.

[57] ABSTRACT

Each phase of the power input circuit in a three-phase electrical system is coupled to a sensor by means of a pick-off transformer. Each sensor has an overcurrent detection circuit comprising a slow response filter, an operational amplifier, and a comparator and an undercurrent detection circuit comprising a fast response filter, an operational amplifier and a comparator. A fourth overcurrent detecting sensor is coupled to a selected system feed circuit. A C/MOS logic circuit responds with a "high" state output when any number of sensor network outputs go to the high state. The output of the C/MOS logic circuit is filtered by a slow response filter and is used to trigger an actuating circuit that operates a standby breaker in the system input circuit.

3 Claims, 5 Drawing Figures

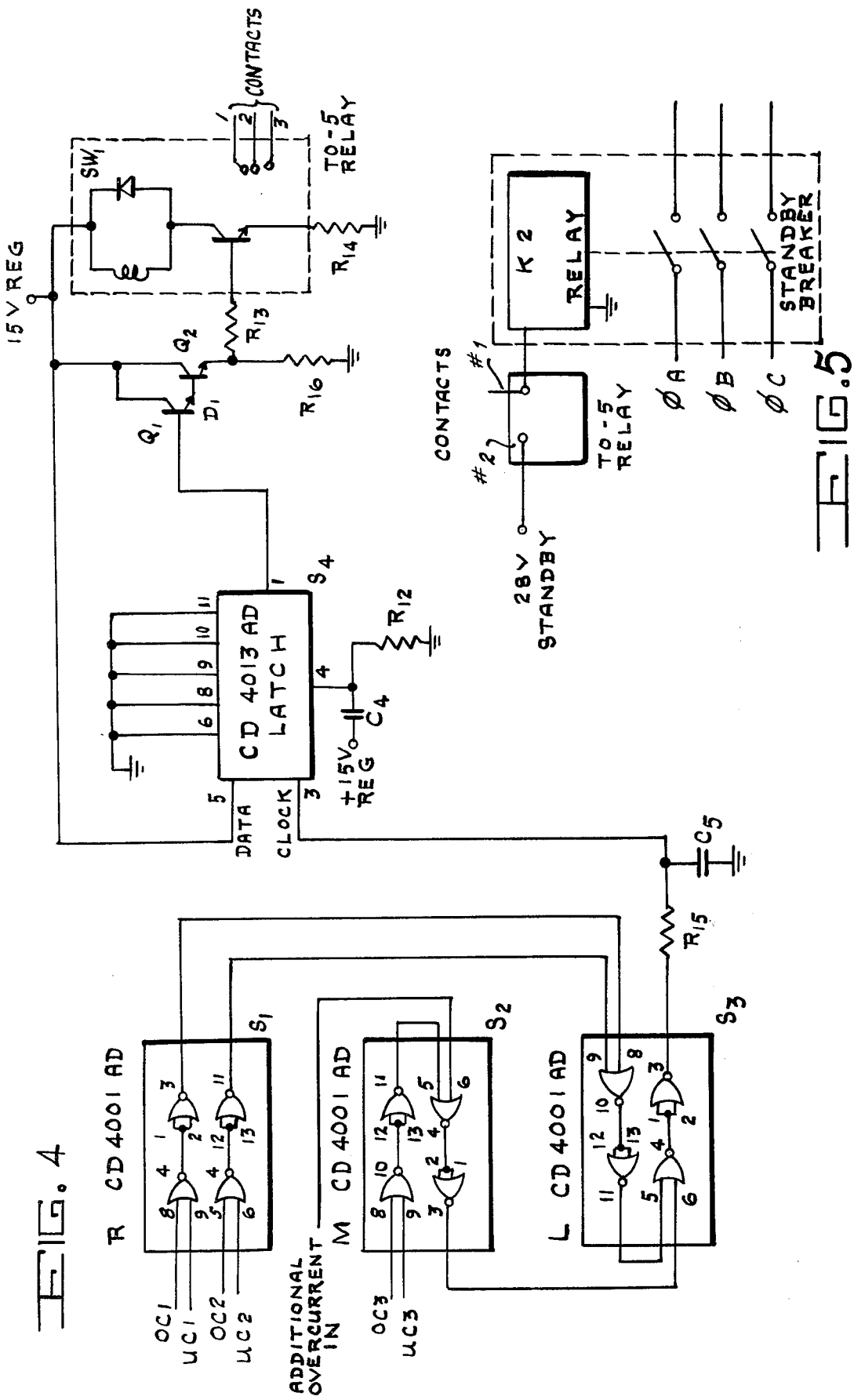

LOW POWER SOLID STATE THREE-PHASE OVERCURRENT/UNDERCURRENT PROTECTION CIRCUIT

STATEMENT OF GOVERNMENT INTEREST

The invention described herein may be manufactured and used by or for the Government for governmental purposes without the payment of any royalty thereon.

BACKGROUND OF THE INVENTION

This invention relates to the monitoring and control of electrical circuits and in particular to means for controlling the three-phase power supply to systems requiring overload and undercurrent protection.

Many electrical systems require the immediate detection of electrical faults and the subsequent disconnecting of system power until such faults are corrected. For instance, airborne radar systems must be protected in this manner in order to avoid damage to radar equipment, smoke in the aircraft cockpit, and other damage of the type that frequently results from power distribution malfunctions. Protection circuits used in airborne and other applications should be lightweight and reliable. It is also desirable that they have adjustable threshold values and that they be easily resettable. In addition, many applications require that the protection circuit include means for preventing false triggering resulting from system noise and short duration faults. Conventional state-of-the-art protection devices in general fail to meet all of the above criteria. The present invention is directed toward providing a protective circuit that will meet all of the above and other objectives.

SUMMARY OF THE INVENTION

The invention is a circuit that is capable of controlling three-phase power to a system requiring such power distribution. It does this by monitoring current in each of the three-phase power lines and also in one additional circuit selected as required. Each phase of the power distribution contains an overcurrent/undercurrent network capable of being separately set at upper and lower current trip values. A positive voltage will be detected at the output of the network in the event that the monitored current falls outside this preset window range. An additional overcurrent network is provided that is capable of monitoring any additional point of concern and contains only an uppercurrent threshold setting which responds with a positive output signal when the preset uppercurrent setting is exceeded. The outputs of the sensing networks are fed to a logic network which drives latching circuitry used to operate a solid state relay. The relay contacts open when any number of the sensing network outputs are in the positive voltage state, thus removing a sustaining voltage to a standby breaker which controls a three-phase input power.

It is a principal object of the invention to provide a new and improved protection circuit for three-phase electrical systems.

It is another object of the invention to provide a protection circuit that is lightweight and reliable and suitable for airborne applications.

It is another object of the invention to provide a protection circuit that is not subject to false triggering from system noise and short duration faults and that the time duration before system shutdown is adjustable.

It is another object of the invention to provide a protection circuit having adjustable threshold values.

These, together with other objects, features and advantages of the invention, will become more readily apparent from the following detailed description when taken in conjunction with the illustrative embodiment in the accompanying drawings.

DESCRIPTION OF THE DRAWINGS

FIG. 4 is a schematic diagram of the logic and latch circuits of FIG. 1; and

FIG. 5 is a schematic diagram of the output relay and standby breaker of FIG. 1.

DETAILED DESCRIPTION OF THE PREFERRED EMBODIMENT

Figure 1:
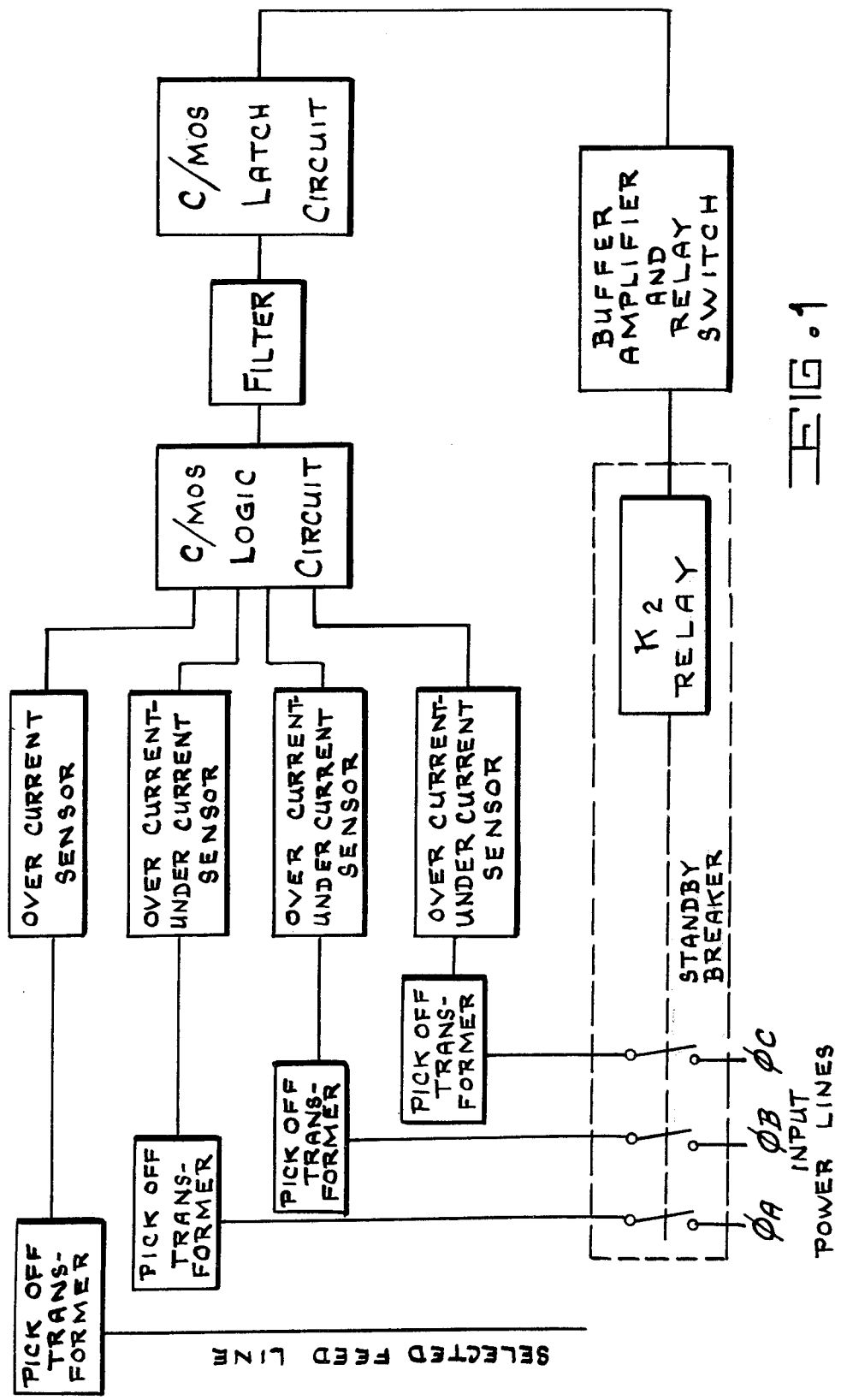
FIG. 1 is a block diagram of one presently preferred embodiment of the invention.
Figures 2, 3:
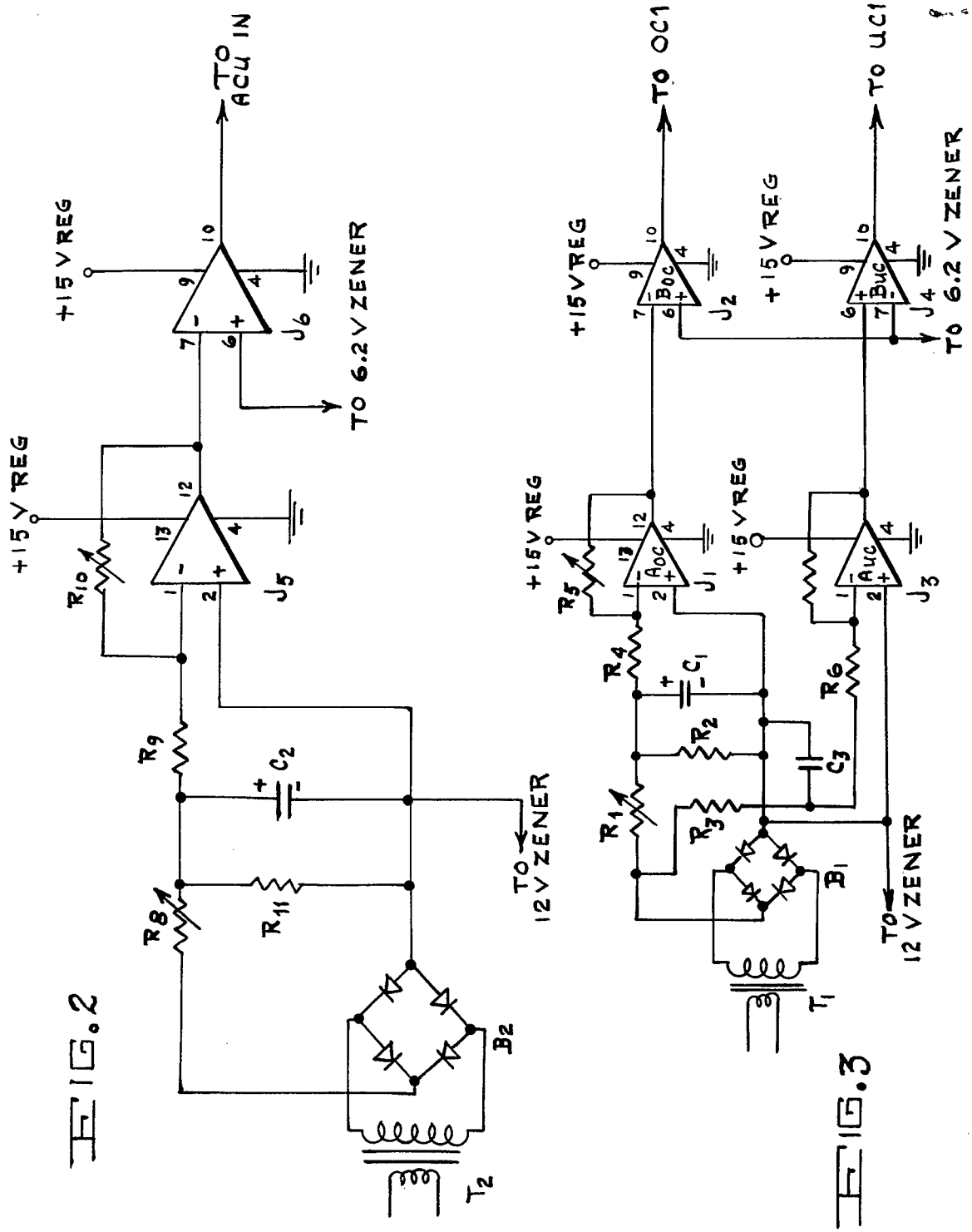
FIG. 2 is a schematic diagram of the overcurrent sensor of FIG. 1.
FIG. 3 is a schematic diagram of one overcurrent/undercurrent sensor of FIG. 1.

The protection circuit of the invention as illustrated by the block diagram of FIG. 1 is capable of monitoring an overcurrent or undercurrent on each of the three-phase input power lines as well as monitoring an overcurrent in a selected feed line. The currents to be monitored flow through the primary of a current sensing pick-off transformer which produces a secondary voltage proportional to the primary current. This voltage is fed to operational amplifier inputs via two separate filtering networks in the overcurrent/undercurrent sensor. A slow response filter precedes the overcurrent operational amplifier assembly while a fast response filter precedes the missing phase (undercurrent) network. The outputs of both the overcurrent and missing phase operational amplifiers are each fed to their respective comparator circuits. Under proper conditions of overcurrent and/or missing phase, both or each of the comparators will produce an output signal which will be sensed by the C/MOS logic network. The output of the logic will be in the "high" state whenever an overcurrent or missing phase (or a combination of these conditions) is sensed by the operational amplifier and comparator networks. This signal is then sensed by a C/MOS latching circuit which maintains a "high" output once it is triggered until a reset command is applied. A buffer amplifier is then stimulated which, in turn, drives an output relay. The relay disconnects the three-phase power to the system being protected via a standby breaker.

Referring now to FIGS. 2-5, a detailed analysis of circuit operation will be described using $\phi A$ as being representative of $\phi B$, $\phi C$, and the selected overcurrent circuits, in addition to $\phi B$ and $\phi C$ undercurrents. The primary of the current sensing pick-off transformer $T_1$ of FIG. 3 monitors $\phi A$ and develops an AC secondary voltage proportional to the primary current. This voltage is fed to bridge rectifier assembly $B_1$ which is then observed by two (fast and slow response) filtering networks. The output of the slow response filter assembly is fed to the overcurrent operational amplifier Aoc network. This filter is formed by $R_1$ and $C_1$. $R_2$ is shunted across $C_1$ to provide a bleeder resistor that quickly discharges it when the system is deactivated. The values of the slow response filter are selected to filter out the spikes that may be generated by the system being protected. As the primary of the current sensing pick-off transformer is increased, a proportional increase appears across the secondary winding which increases the value of the rectified DC voltage fed across pins 1 and 2 of the operational amplifier Aoc. Without a signal input to the operational amplifier, the output (pin 12) remains at a value above system ground as governed by the reference diode voltage at pin 2 of the operational amplifier input. As the DC across pins 1 and 2 increases as a result of an increase of primary current through $\phi A$, the inverting property of the operational amplifier causes the reference diode output voltage at pin 12 to drop. This voltage is sensed at pin 7 of the operational amplifier comparator Boc. Since pin 6 of the comparator is referenced by a Zener diode (6.2V) the output (pin 10) will remain in a "low" state until the input operational amplifier output voltage drops below 6.2V with respect to system ground. At this point, a "high" signal will appear at pin 10 and trigger the logic network of FIG. 4. Pin 3 of the L network (bottom CD4001AD) will then go into a high state. The $R_{15}C_5$ filter tied to this pin causes this filter output to slowly rise to allow the CD4013AD latch to reset without causing a false trigger output pulse to occur at system "turn-on". When a situation has occurred to cause the output of the $R_{15}C_5$ filter to raise above the threshold of the CD4013AD latch, pin 1 of the latch circuit will trigger the Darlington buffer $D_1$ which, in turn, will trip the transistor-driven TO-5 relay to an open state. Since the TO-5 relay was installed in the system to cut the 28V standby voltage, the $K_2$ relay will release and open a series of electrical contacts in $\phi A$, B, and C input power lines. $\phi A$, B and C sensors also have missing phase capabilities, each of which will shut down the system in the same manner as described above for the $\phi A$ overcurrent circuit when a phase is opened. The fast response filter ($R_3$, $C_3$) previously mentioned, feeds the undercurrent sensor networks. The purpose of this filter is not only to smooth the output ripple of the bridge rectifier $B_1$ but also to respond quickly to a current change in the primary of the current sensing pick-off transformer upon application of power to the system. If the response of this filter were too slow, the output of the undercurrent sensor comparator would remain in the high state immediately upon turn-on for a long enough time for the system to see an open phase erroneously.

In order to reset the protection circuit once it has been triggered due to a fault, it is necessary to remove the DC supply voltage to the board (28V in this case). In this situation, this is done by turning the system function switch completely off for a period of two seconds or more before attempting to reenergize the system. Simply reducing the current (in an overcurrent situation) below the trip value or reconnecting an open phase (in a missing phase situation) without turning the function switch to "off" will not reset the protection network.

By way of specific example, the following component list identifies the various components and component values used in one particular embodiment of the invention.

| | | |
|---|---|---|
| $R_1$ | 500K | Potentiometer |
| $R_2$ | 110K | " |
| $R_3$ | 2.2K | " |
| $R_4$ | 110K | " |

-continued

| | | |
|---|---|---|
| $R_5$ | 500K | " |
| $R_6$ | 100K | ¼ watt |
| $R_7$ | 500K | Potentiometer |
| $R_8$ | 500K | " |
| $R_9$ | 200K | " |
| $R_{10}$ | 500K | " |
| $R_{11}$ | 110K | ¼ watt |
| $R_{12}$ | 10K | ¼ watt |
| $R_{13}$ | 470K | ½ watt |
| $R_{14}$ | 100 | ½ watt |
| $R_{15}$ | 680K | ¼ watt |
| $R_{16}$ | 910 | ½ watt |
| $R_{17}$ | 390 | 1 watt |
| $R_{18}$ | 390 | 1 watt |
| $C_1$ | 22 | $\mu f$ |
| $C_2$ | 22 | $\mu f$ |
| $C_3$ | 6.8 | $\mu f$ |
| $C_4$ | 8.2 | $\mu f$ |
| $C_5$ | 3.3 | $\mu f$ |
| $C_6$ | 6.8 | $\mu f$ |
| $C_7$ | 8.2 | $\mu f$ |
| $S_1$ | | CD4001AD |
| $S_2$ | | " |
| $S_3$ | | " |
| $S_4$ | | CD4013AD |
| $T_1$ | | Magnetico 12581 |
| $T_2$ | | Magnetico 12581 |
| $J_1 + J_2$ | | 747 DM (Dual Op-Amp) |
| $J_3 + J_4$ | | 747 DM (Dual Op-Amp) |
| $J_5 + J_6$ | | 747 DM (Dual Op-Amp) |
| $B_1$ | | IN4004 (quantity 4) |
| $B_2$ | | IN4004 (quantity 4) |
| $SW_1$ | | Teledyne 4iiT-12 Relay |
| $Q_1$ | 2N2219 | Transistor |
| $Q_2$ | 2N2219 | Transistor |

While the invention has been described in one presently preferred embodiment, it is understood that the words which have been used are words of description rather than words of limitation and that changes within the purview of the appended claims may be made without departing from the scope and spirit of the invention in its broader aspects.

What is claimed is:

1. A protection circuit for a three-phase electrical system comprising
   a pick-off transformer connected to each phase of the system power input circuit,
   an overcurrent/undercurrent sensing means connected to the secondary of each said pick-off transformer, each said overcurrent-undercurrent sensing means comprising a rectifier bridge, a slow response filter connected to the output of said rectifier bridge, a first operational amplifier connected to receive the output of said slow response filter, a first comparator means connected to the output of said first operational amplifier, a fast response filter connected to the output of said rectifier bridge, a second operational amplifier connected to receive the output of said fast response filter, and a second comparator means connected to the output of said second operational amplifier,
   a pick-off transformer connected to a selected system feed line,
   an overcurrent sensing means connected to the secondary of the feed line pick-off transformer, said overcurrent sensing means comprising a rectifier bridge, a slow response filter connected to the output of said rectifier bridge, an operational amplifier connected to receive the output of said slow response filter, and a comparator means connected to the output of said operational amplifier, a logic circuit having an output responsive to the outputs of said overcurrent/undercurrent and overcurrent sensing means, a standby breaker connected in said system power input circuit, actuator means responsive to the output of said logic circuit for operating said standby breaker and, a slow response filter connected to filter the output of said logic circuit.

2. A protection circuit for a three-phase electrical system as defined in claim 1 wherein said logic circuit comprises a C/MOS circuit.

3. A protection circuit for a three-phase electrical system as defined in claim 1 wherein said actuator means comprises a C/MOS latch circuit, a buffer amplifier and a relay means, said buffer amplifier being connected to drive said relay means in response to the output of said latch circuit and said relay means being connected to operate said standby breaker.

* * * * *